Patented Dec. 16, 1941

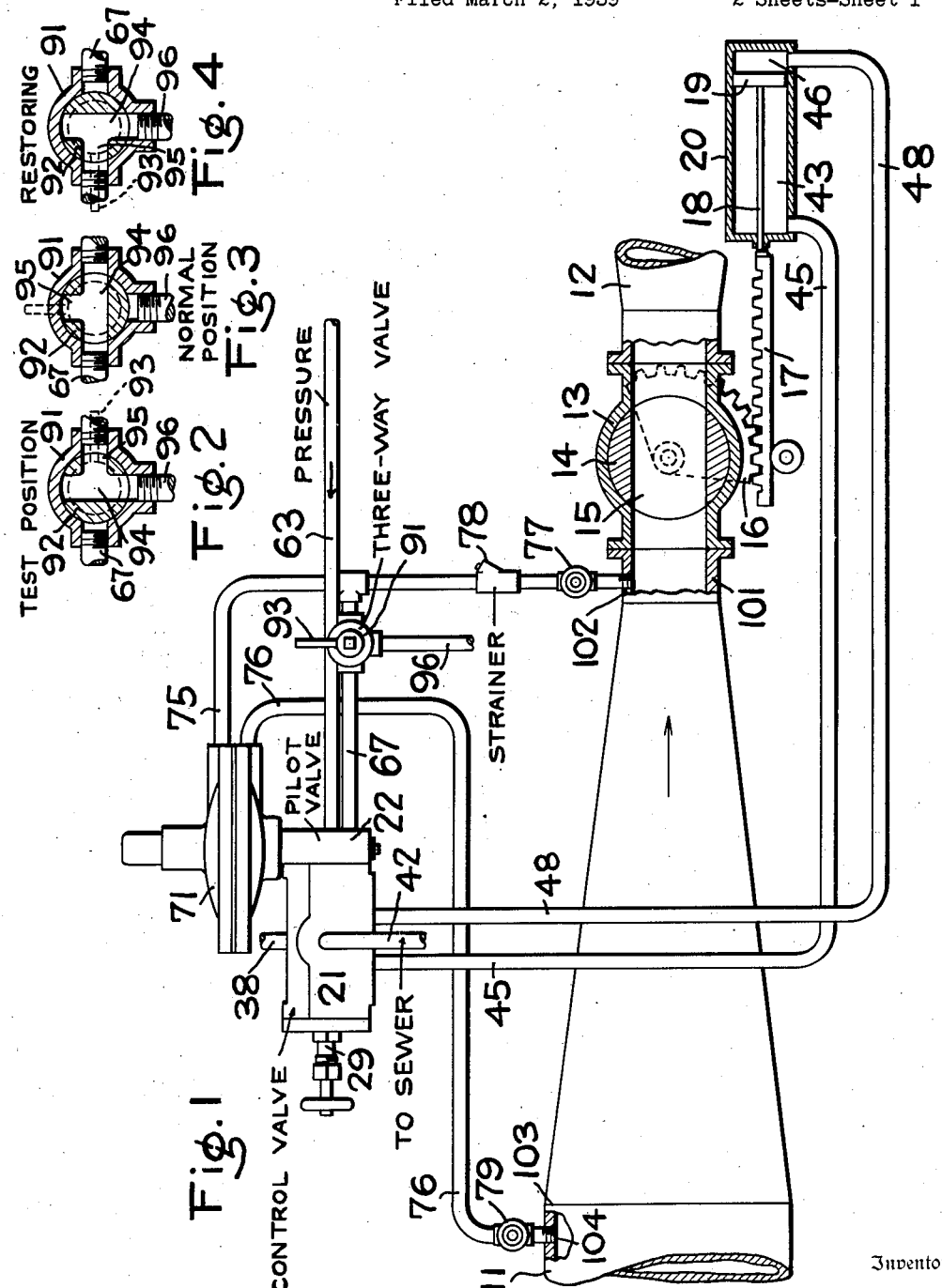

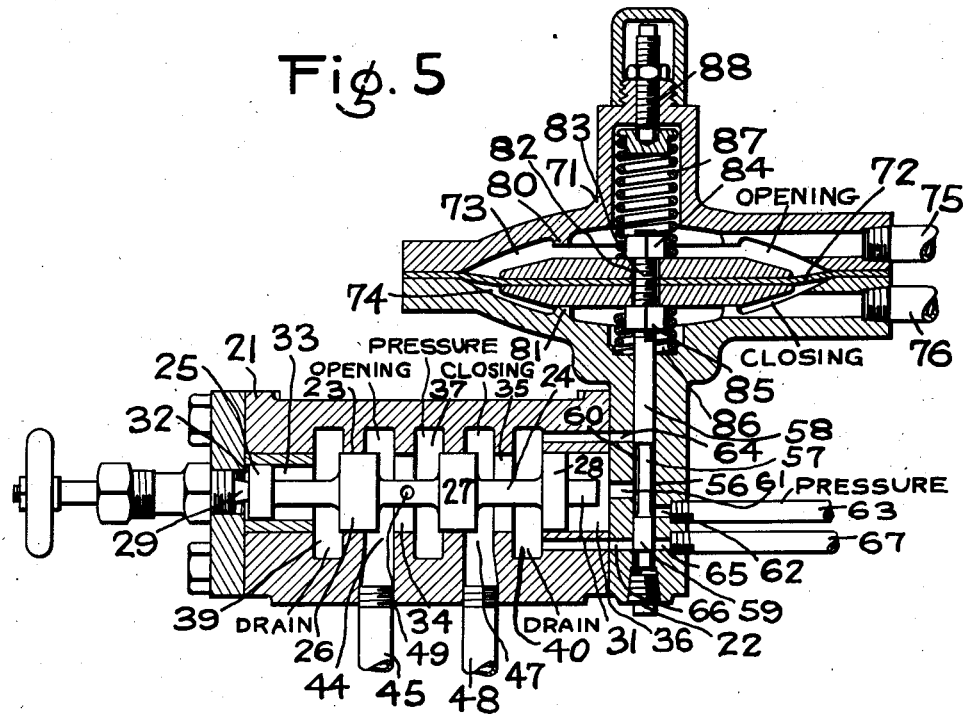
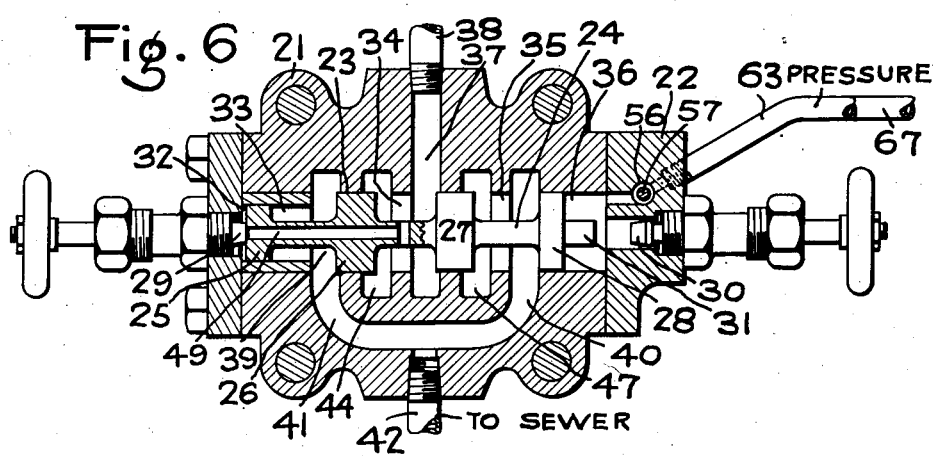

2,266,533

UNITED STATES PATENT OFFICE 2,266,533

FLUID CONTROL MEANS

Eugene C. Brisbane and Frank E. Peacock, York, Pa., assignors to S. Morgan Smith Company, York, Pa., a corporation of Pennsylvania Application March 2, 1939, Serial No. 259,318

9 Claims. (Cl. 137—153)

This invention relates to fluid control means.

In some installations, fluid under pressure is delivered to a pipe line by a pump, a blower, or by gravity from a reservoir or the like. Control valves, usually of the automatically operated type, are installed in the pipe line for the purpose of controlling the flow of fluid therethrough. These control valves may function as check valves for cutting off communication through the pipe line when the pressure of the fluid decreases a predetermined amount, such for instance, as failure of the pump or the blower to properly function. Also, the control valves may be adapted to cut off communication through the pipe line when the flow exceeds a predetermined normal flow desired.

An object of the invention is to provide an improved fluid controlling means for pipe lines and the like, in which the pipe line has installed therein a valve adapted to control communication through the pipe line in such a manner that when the flow exceeds a predetermined amount the valve will be automatically closed.

Another object of the invention is to provide an improved fluid controlling means embodying an automatically operable valve, in which manually operable means are included in the valve control mechanism for controlling the opening of the valve after the valve has closed due to an excess flow of fluid in the pipe line.

With the foregoing and other objects and advantages in view, the invention consists in the preferred construction and arrangement of the several parts which will be hereinafter fully described and claimed.

In the accompanying drawings:

Figure 1 is a diagrammatic view, partly in section, of a fluid control apparatus embodying the invention;

Figs. 2, 3 and 4 are diagrammatic sections of the manually operable valve shown in Fig. 1, showing the three positions thereof;

Fig. 5 is a vertical longitudinal section of the valve control mechanism in valve open position; and Fig. 6 is a horizontal section of the control valve shown in Fig. 5.

Referring to the drawings, the main pipe line consists of sections 11 and 12, connected to the opposite ends of a valve 13.

Pipe 11 may lead from a suitable source of supply, and the fluid in the pipe line is normally maintained at a predetermined pressure by means of a pump (not shown).

The valve 13 has a rotatable plug 14 with a waterway 15 formed therein.

The plug 14 is adapted to be rotated by suitable mechanism so as to control communication through the pipe line.

In the present instance the plug operating mechanism is shown as comprising a sector 16 which is fixed to one end of the stem of the valve plug 14 and has teeth in meshing relationship with the teeth of a rack bar 17.

One end of the rack bar 17 is connected to the end of a rod 18 of a piston 19 mounted in a cylinder 20.

Reciprocation of the piston 19 within the cylinder 20 is adapted to turn the plug 14 through an angle of approximately 90° so as to position the waterway 15 of the plug 14, whereby the flow of fluid through the pipe line is either cut off or permitted.

For the purpose of controlling the operation of the piston 19, a suitable control valve device 21 is employed.

The control valve 21 in turn is under the control of a pilot valve device 22 operatively connected to the pipe line in the manner to be hereinafter described.

As shown in Figs. 5 and 6, the control valve device 21 comprises a casing formed with a bore 23 consisting of two concentric cylindrical portions of different diameters, in which is mounted a plunger 24 formed with spaced apart heads 25, 26, 27 and 28.

The movement of the plunger 24 in one direction is limited by an adjustable stop 29 which is adapted to engage the end of the plunger having the head 25, and the movement of the plunger in the opposite direction is limited by an adjustable stop 30 (Fig. 6) which is adapted to engage an extension 31 on the end of the plunger 24 having the head 28.

The portion of the bore 23 in which the plunger head 25 is disposed is of less diameter than the diameter of the remainder of said bore.

The plunger heads divide the bore 23 into a plurality of chambers 32, 33, 34, 35 and 36.

Chamber 34 is connected to a source of fluid under pressure by a port and passage 37 and a pipe 38.

The chambers 33 and 35 are connected to a free discharge or sewer, by ports 39 and 40, respectively, passage 41 connecting said ports, and a pipe 42, (Fig. 6).

As shown in Figs. 1 and 5, when the plunger 24 is in a certain position, chamber 34 is connected to piston chamber 43 by a port 44 and pipe 45, and chamber 35 is connected to the other piston chamber 46, by a port 47 and pipe 48.

The ports 39 and 40 are termed drain ports. Port 44 is termed the valve opening port. Port 47 is termed the valve closing port.

Fluid under pressure is adapted to be supplied by pipe 38 and passage and port 37 to chamber 34 so that said chamber is always supplied with fluid under pressure. Port 37 is, therefore, termed the pressure port.

Chamber 32 is also adapted to be supplied with fluid under pressure at all times by passage and port 49.

When the valve 13 is in open position the plunger 24 is in the position shown in Figs. 5 and 6, in which position port 44 is connected to port 37 through chamber 34 so that fluid under pressure will be supplied to the piston chamber 43 through pipe 45. Chamber 46 on the opposite side of the piston 19 is connected to the sewer 42 through pipe 48, port 47, chamber 35, port 40 and passage 41.

The pilot valve device 22 comprises a casing formed with a bore 56, in which is slidably mounted a valve element 57 having two spaced heads 58 and 59.

Chamber 60 in the bore 56 between the valve heads 58 and 59 is connected to the control valve chamber 36 heretofore referred to by a port and passage 61.

The chamber 60 is also connected to a source of supply of fluid under pressure by a port 62 and pipe 63.

The bore 56, above the chamber 60, is connected to the drain port 40, by a passage and port 64. When the pilot valve device 22 is in the position shown in Fig. 5, head 58 laps port 64, thereby cutting off communication through the port and passage 64.

Leading into the bore 56, below the chamber 60, are two ports 65 and 66.

A pipe 67 is connected to port 65, and the port 66 connects the bore 56 with the control valve drain port 40. When the pilot valve device 22 is in the position shown in Fig. 5, head 59 laps the ports 65 and 66.

In the present instance the pilot valve element 57 is shown operatively connected to a fluid pressure operated device, such as a diaphragm device 71.

The diaphragm device 71 has a diaphragm 72 mounted in a suitable casing between two chambers 73 and 74.

Chamber 73 is connected to a suitable source of fluid under pressure by means of a pipe 75, and chamber 74 is connected to a suitable source of fluid under pressure by means of a pipe 76.

Communication through pipe 75 may be controlled by means of a valve 77, and between said valve and the diaphragm device 71, a strainer device 78 may be installed in the pipe 75.

Communication through pipe 76 may be controlled by a valve 79.

The movement of the diaphragm 72 is limited by stops 80 and 81 formed in the casing of the diaphragm device on opposite sides of said diaphragm.

The end of the pilot valve element 57 opposite to the end having the head 59 extends through an opening 82 formed in the diaphragm 72. This portion of the element 57 is formed with screw threads 83 for the reception of nuts 84 and 85 disposed on opposite sides of the diaphragm 72 and adapted to permit adjustment of the pilot valve element 57 with respect to the diaphragm 72, so that the heads 58 and 59 can be properly positioned within the bore 56 when the parts are being assembled.

Disposed in the diaphragm chamber 74 and encircling the valve element 57 and bearing against one side of the diaphragm 72, is an expansible coil spring 86.

Disposed in the diaphragm chamber 73 and bearing against the side of the diaphragm 72 opposite to the side facing of the spring 86, is an expansible coil spring 87, means, such as indicated at 88, Fig. 5, being provided for adjusting the tension of said spring 87.

The tension of the spring 87 is considerably greater than the tension of the spring 86, the latter spring being employed merely to provide means for resiliently supporting the diaphragm when the diaphragm is in the down position shown in Fig. 5 and to assist in urging the diaphragm upwardly from such down position when fluid under pressure is supplied to the chamber 74 during operation of the device, as will be hereinafter described.

As shown in Fig. 1, pipe 67 may be connected to pipe 75, and for the purpose of controlling communication through pipe 67, a three-way valve device 91 is installed in said pipe at any convenient place between the pilot valve device 22 and the junction of the pipe 67 with the pipe 75.

The valve 91 has a plug 92 adapted to be turned to the three positions shown in Figs. 2, 3 and 4, by means of a handle 93. The plug 92 is formed with a through waterway 94 and a branch waterway 95 leading from the through waterway 94 and adapted to establish communication from pipe 67 to a pipe 96 for the purpose to be hereinafter described. The pipe 96 leads to a free discharge or sewer.

The main pipe line is formed with a contracted throat 101, the valve 13 being located on the downstream side of said throat.

Pipe 75 is connected to the throat 101 by a piezometer connection 102.

The pipe 76 is connected to the upstream side or inlet 103 of the throat 101 by a piezometer connection 104.

It is well known in the art that when it is desired to measure the rate of flow of fluid in a pipe line or other conduit, an orifice plate, Venturi tube, or other obstruction is inserted in the pipe line, thereby setting up one pressure on one side and another pressure on the other side. The invention does not contemplate the measurement of the rate of flow, but it does make use of the pressure differential set up by the measuring device, such as the Venturi tube shown in Fig. 1. This is connected in the pipe line so that the flow in the direction of the arrow first reaches the inlet 103 and then passes through the throat 101.

It is in the throat 101 that pressure gives way to velocity. Assuming a fluid flow at a uniform rate, the velocity in the throat 101 will exceed the pipe line velocity at the point at the left of the Venturi tube indicated by the numeral 11, but the pressure head in the inlet 103 will exceed the pressure head in the throat 101. This pressure differential is utilized as the force for controlling the closing and opening of the valve 13.

At normal flow of fluid in the main pipe line, the low pressure on the opening side of the diaphragm in chamber 73, plus the pressure of the spring 87, is sufficient to hold the diaphragm in the open position, shown in Fig. 5, against the high pressure of the fluid on the closing side of the diaphragm in chamber 74.

At a certain predetermined flow of the fluid in the main pipe line above normal, the high pressure on the closing side of the diaphragm (chamber 74) overcomes the low pressure plus the spring load on the opening side of the diaphragm (chamber 73) and the diaphragm is moved upwardly.

When the diaphragm 72 is in the valve open position shown in Fig. 5, the pilot valve head 58 laps port 64, and the pilot valve head 59 laps ports 65 and 66.

Ports 61 and 62 are uncovered, thereby permitting fluid under pressure supplied by pipe 63, to flow from the pilot valve chamber 60 to the control valve chamber 36, and the control valve plunger 24 is positioned as shown in Figs. 5 and 6.

In this position of the plunger 24, piston chamber 46 is connected to the sewer or free discharge by pipe 48, port 47, chamber 35, port 40, passage 41, and pipe 42, and fluid under pressure is supplied to piston chamber 43, from the control valve pressure chamber 34, through port 44, and pipe 45.

In this way the piston 19 is positioned in cylinder 20 so that the valve plug 14 is in the open position shown in Fig. 1.

Under such operating conditions as above described, the plug of the valve 91 is disposed in the position shown in Fig. 3, in which position communication is maintained through pipe 67 from the pilot valve device 22 to the pipe 75. However, as shown in Fig. 5, pilot valve head 59 laps the port 65 so that the end of the branch pipe line provided by pipe 67 is closed when the valve 13 is in open position.

When the flow of the fluid in the main pipe line 11 increases a predetermined amount above the normal flow in the pipe line, the high pressure of fluid transmitted to diaphragm chamber 74 from the piezometer 104 through pipe 76 overcomes the low pressure plus the load of the spring 87 in chamber 73 and the diaphragm 72 is moved upwardly away from the stop 81.

In the upward movement of the diaphragm 72, the pilot valve element 56 is also moved upwardly, so that port 62 is lapped and ports 64 and 65 uncovered.

With port 62 closed, fluid under pressure from pipe 63 is cut off from the control valve chamber 36, and with port 65 uncovered fluid under pressure in the low pressure pipe line 75 is vented to the sewer, through port and passage 66, port 40, passage 41 and pipe 42.

Chamber 36 is also connected to the sewer through port 61, chamber 60, port and passage 64, port 40, passage 41, and pipe 42, so that the pressure which has maintained the control valve plunger 24 in valve open position is vented.

The pressure of the fluid in chamber 32 acting upon the plunger head 25 then shifts the plunger from the position shown in Figs. 5 and 6, towards the right. In this way the heads 26 and 27 are moved to the position in which port 44 is cut off from the fluid supply chamber 34 and connected to the free discharge or sewer pipe 42, thereby venting piston chamber 43. At the same time, piston chamber 46 is connected to the fluid supply chamber 34, through port 47 and pipe 48, so that the piston 19 is actuated to operate the valve plug mechanism and effect rotation of the plug 14 towards closed position.

When the port 65 is uncovered, the low pressure or opening side of the diaphragm (chamber 73) is connected to the sewer, as has been heretofore described, thus bleeding the pressure from the diaphragm chamber 73 and causing the diaphragm to remain in the valve closed position against the stops 80. With the diaphragm so positioned, the valve 13 will remain in its closed position.

After the cause of the excess flow in the main pipe line has been determined, and the cause remedied, before the valve 13 can be opened, it is necessary to manually operate the three-way valve 91 by turning the plug 92 from the position shown in Fig. 3, to the position shown in Fig. 4, which latter position is termed the restoring position. In this way the pressure of the fluid supplied to diaphragm chamber 73 through pipe 75, is permitted to build up again, since the venting of fluid under pressure through pipe 67, port 65, port and passage 66, port 40, passage 41, and pipe 42, is cut off.

When the valve 13 is closed, there will not be any flow of fluid through the pipe line 11, and consequently after the valve 91 has been operated in the above described manner, the pressure of the fluid supplied to both diaphragm chambers 73 and 74 becomes equal. Under the force exerted by the spring 87, the diaphragm will be moved to the position shown in Fig. 5, thereby effecting operation of the pilot valve 22, the control valve device 21, and the plug operating mechanism, so that the plug 14 is turned from closed to the open position shown in Fig. 1. After the plug of the valve 13 has thus been opened, the operator turns the plug 92 of the valve 91 from the position shown in Fig. 4 to the position shown in Fig. 3, so that the parts are again positioned for normal flow of fluid through the main pipe line 11.

When it is desired to test the action of the diaphragm 72, pilot valve device 22, and the control valve device 21, the three-way valve 91 is operated to turn the plug 92 from the position shown in Fig. 3 to the position shown in Fig. 2. In the latter position fluid under pressure in pipe line 75 will be vented to the sewer pipe 96, thus bleeding the pressure from the opening side (chamber 73) of the diaphragm device. The diaphragm 72 thus moves upwardly under the force exerted by the pressure of the fluid in the diaphragm chamber 74, thereby causing the mechanism to operate to close the valve plug 14 in the manner heretofore described.

After the test has been made, the plug 92 of the valve 91 should be turned to the restoring position (see Fig. 4), whereupon the pressure of the fluid supplied to diaphragm chamber 73 through pipe 75, is built up again, thereby restoring the diaphragm and its associated parts to their normal positions.

The purpose of the valve 77 is to control communication through the pipe 75. When the apparatus has been assembled and the parts are being tested, the valve 77 is adjusted so that when the diaphragm device 71 functions to effect closing of the valve 13 no more fluid will be passed through the pipe 75 from the throat 101 than the waste ports 65 and 66 can carry off. In this way an increase in the pressure in diaphragm chamber 73 sufficient to overcome the pressure in the diaphragm chamber 74 is prevented. The diaphragm device 71 will be less sensitive to variations in flow conditions which result in causing false operations when small, instantaneous surges, such as water hammer conditions and the like occur in the main pipe line 11.

Having thus described our invention, what we claim is:

1. In a system for controlling the flow of a fluid the combination with a pipe line having a constricted throat, of a main valve for controlling the flow located at the throat, fluid pressure operated mechanism for the main valve, a control valve for controlling the operation of said valve mechanism, fluid pressure operated means for operating said control valve, a pilot valve device for controlling the operation of said control valve operating means, fluid pressure operated means for operating the pilot valve and having opposed chambers and a diaphragm therebetween, one chamber being connected to the throat on the upstream side of the main valve and the other chamber being connected to the inlet of the throat to thereby provide a pressure differential on opposite sides of the diaphragm and a spring acting against the high pressure from the inlet to unbalance the diaphragm and thereby effect operation of the mechanism to retain the main valve in open position under predetermined flow of fluid through the pipe line, a pipe connecting the pilot valve with the pipe connecting the throat and the first diaphragm chamber, whereby low pressure fluid is supplied to the pilot valve for distribution to the control valve when the pilot valve is operated from valve open position to valve closed position, said second diaphragm chamber being adapted to be supplied with sufficient fluid from the inlet to move the diaphragm away from valve open position upon a predetermined increase in flow of fluid in the pipe line, means for connecting the first diaphragm chamber with a sewer when the diaphragm is actuated by an excess of fluid pressure in the pipe line to thereby bleed the pressure from the diaphragm chamber and cause the diaphragm to remain in valve closed position, and a manually operated normally open valve in the pilot valve connecting pipe adapted to be closed to cut off the communication of the first diaphragm chamber with the sewer to thereby permit fluid from the throat to build up again in the first diaphragm chamber and thereby restore the pilot valve operating means to an operative condition.

2. A fluid control system comprising a pipe line, a main valve for controlling communication through the pipe line, fluid pressure operated mechanism for operating said valve, a control valve for said mechanism, fluid pressure means for operating said control valve, a pilot valve for controlling said control valve operating means, fluid pressure means operable upon normal flow of fluid in the pipe line to retain the pilot valve in position whereby the control valve is held by its operating means in main valve open position, means connecting said pilot valve fluid pressure means with the pipe line whereby upon an increase in flow in the pipe line the pilot valve is actuated to effect closing of the main valve, means for connecting said pilot valve actuating means with a sewer when the main valve is in closed position for rendering said pilot valve operating means inoperative, and means for disconnecting said pilot valve operating means from the sewer and for connecting the same with a source of fluid under pressure to thereby restore the pilot valve operating means to an operative condition.

3. In a system for controlling the flow of a fluid the combination with a pipe line having a constricted throat, of a main valve located at the throat for controlling the flow, fluid pressure operated mechanism for operating said valve, a fluid pressure operated control valve for said mechanism, a pilot valve for controlling the operating pressure of said control valve, operating means for said pilot valve connected to points of different size in said pipe line and operated by variations in the differences of pressure caused by variations in flow therein, means controlled by said pilot valve when the pilot valve is operated upon a predetermined increase in the flow of fluid in the pipe line for exhausting the pressure from one of said connections to render the pilot valve operating means inoperative, and a valve for controlling the flow of fluid through said exhausting means.

4. In a system for controlling the flow of fluid the combination with a pipe line having a constricted throat, of a main valve located at the throat for controlling the flow, fluid pressure operated mechanism for operating said valve, a fluid pressure operated control valve for said mechanism, a pilot valve for controlling the operating pressure of said control valve, fluid pressure mechanism operatively connected with the pipe line and responsive to variations in pipe line pressure for operating said pilot valve, said pilot valve being disposed in position to maintain the main valve in open position under predetermined normal flow of fluid in the pipe line and being operable by its operating mechanism when the flow in the pipe line exceeds a predetermined amount to effect closing of the main valve, fluid connections controlled by the pilot valve and retained closed thereby when the main valve is in open position and opened by the pilot valve when the main valve is in closed position for exhausting fluid pressure from the pilot valve operating mechanism to render the same inoperative when the main valve is closed, and a valve for controlling said exhausting means and operable to restore fluid pressure to the pilot valve operating means.

5. A fluid control system comprising a pipe line, a main valve for controlling communication through the pipe line, fluid pressure operated mechanism for operating said main valve, a control valve for said mechanism, fluid pressure means for operating said control valve, a pilot valve for controlling said control valve operating means, fluid pressure operated means for operating the pilot valve and having opposed chambers and a diaphragm therebetween, said diaphragm being connected to said pilot valve, means for supplying fluid pressure to the chambers on the opposite sides of said diaphragm, said diaphragm being adapted under normal flow of fluid in the pipe line to retain the pilot valve in position to hold the control valve in main valve open position, said diaphragm being operable upon an increase in flow in the pipe line to actuate the pilot valve to effect operation of said control valve to effect closing of the main valve, means for connecting one of the diaphragm chambers with a sewer when the main valve is in closed position for rendering said diaphragm inoperative, and means for disconnecting said diaphragm chamber from the sewer and for connecting the same with a source of fluid under pressure to thereby restore the diaphragm to an operative condition.

6. The combination with a pipe line having a check valve therein and fluid pressure operated mechanism for said valve, of a fluid pressure operated control valve for said mechanism, a pilot valve for controlling the operating pressure of said control valve, fluid pressure responsive means operatively connected with the pipe line and responsive to variations in pipe line pressure for operating said pilot valve, said pilot valve being positioned by its operating means to effect operation of the control valve so as to maintain the check valve open under predetermined normal flow of fluid in the pipe line, said pilot valve being operable by its operating means when the flow in the pipe line exceeds a predetermined amount to effect operation of the control valve so as to effect closing of the check valve, a fluid connection controlled by the pilot valve and normally closed when the check valve is open and opened by the pilot valve when the check valve is in closed position for exhausting fluid pressure from the pilot valve operating means to render the same inoperative when the check valve is closed, and an independent means for controlling said exhausting connection and operable to restore fluid pressure to the pilot valve operating means.

7. In a valve control system, the combination with a valve having a port connected with a sewer, a pilot valve for controlling communication to said port, fluid pressure operated means for operating said pilot valve, means for supplying operating fluid to said fluid pressure operated means, said fluid pressure operated means being operable under a predetermined condition to retain the pilot valve in position to close the communication to said port and being operable under a condition other than the predetermined condition to move the pilot valve to a position in which communication through the port is open, and a connection between the fluid pressure operating means and said pilot valve to connect the fluid pressure operating means through said port to the sewer when the pilot valve is open to thereby render said fluid pressure means inoperative.

8. In a valve control system, the combination with a valve having a port connected with a sewer, of a pilot valve for controlling communication to said port, fluid pressure operated means for operating said pilot valve, means for supplying operating fluid to said fluid pressure operated means, said fluid pressure operated means being operable under a predetermined condition to retain the pilot valve in position to close the communication to said port, said fluid pressure operated means being operable under a condition other than the predetermined condition to move the pilot valve to a position in which communication through the port is open, a connection between the fluid pressure operating means and said pilot valve for connecting the fluid pressure operating means through said port to the sewer when the pilot valve is open to thereby render said fluid pressure means inoperative, and means for controlling communication through said connecting means so that the open communication of the fluid pressure means with the sewer can be controlled independently of the pilot valve and thereby restore the fluid pressure means to an operative condition.

9. In a fluid control means, the combination with a valve having a port connected with a sewer, a pilot valve for controlling communication to said port, fluid pressure operated means for operating the pilot valve, said fluid pressure operated means having opposed chambers and a diaphragm therebetween, said diaphragm being connected to said pilot valve, means for supplying fluid pressure to the chambers on the opposite sides of the diaphragm, said diaphragm being operable under a predetermined condition when an excess of fluid pressure is supplied to one chamber and the diaphragm is unbalanced to move in the direction in which the pilot valve closes the communication to said port, said diaphragm being operable under a condition other than the predetermined condition when the diaphragm is unbalanced in the opposite direction so that the pilot valve is moved to open communication to said port, a connection between the first diaphragm chamber and the pilot valve for venting operating fluid from said first chamber through said port and to the sewer when the port is open by said pilot valve, thereby rendering said diaphragm inoperative, and means for controlling communication through said connecting means so that the open communication of the diaphragm chamber with the sewer can be controlled independently of the pilot valve to restore the diaphragm to an operative condition.

EUGENE C. BRISBANE.
FRANK E. PEACOCK.